United States Patent [19]
Kaneko et al.

[11] Patent Number: 5,131,743
[45] Date of Patent: Jul. 21, 1992

[54] APPARATUS AND METHOD FOR INSPECTING OPTICAL FIBERS

[75] Inventors: Shigeki Kaneko, Kounosu; Takao Sakurai, Sano, both of Japan

[73] Assignee: Advantest Corporation, Tokyo, Japan

[21] Appl. No.: 734,736

[22] Filed: Jul. 23, 1991

[30] Foreign Application Priority Data

Jul. 25, 1990 [JP] Japan .................... 2-198698

[51] Int. Cl.⁵ ........................... G01N 21/88
[52] U.S. Cl. ................................. 356/73.1
[58] Field of Search ......................... 356/73.1

[56] References Cited

U.S. PATENT DOCUMENTS 4,848,463  2/1990  Sakamoto et al. ................. 356/73.1

*Primary Examiner*—Vincent P. McGraw
*Attorney, Agent, or Firm*—Staas & Halsey

[57] ABSTRACT

An optical pulse of a fixed width is applied to an optical fiber, back scattering light from the optical fiber is converted to an electric signal, which is converted to a digital signal by sampling with a fixed period. In a difference calculating section an average of digital signals at a first sample point and at W sample points preceding the first sample point is used as data at the first sample point, and an average of digital signals at a second sample point and at W sample points following the second sample point, which is after the first sample point by a number of sample points corresponding to the width of the optical pulse, is used as data at the second sample point. The difference between the data at the first sample point and the data at the second sample point is calculated for each of a series of sample points to obtain difference waveform data. Changing points of the difference waveform data are detected and a spliced point of the optical fiber is decided, based on the detected changing points.

22 Claims, 7 Drawing Sheets

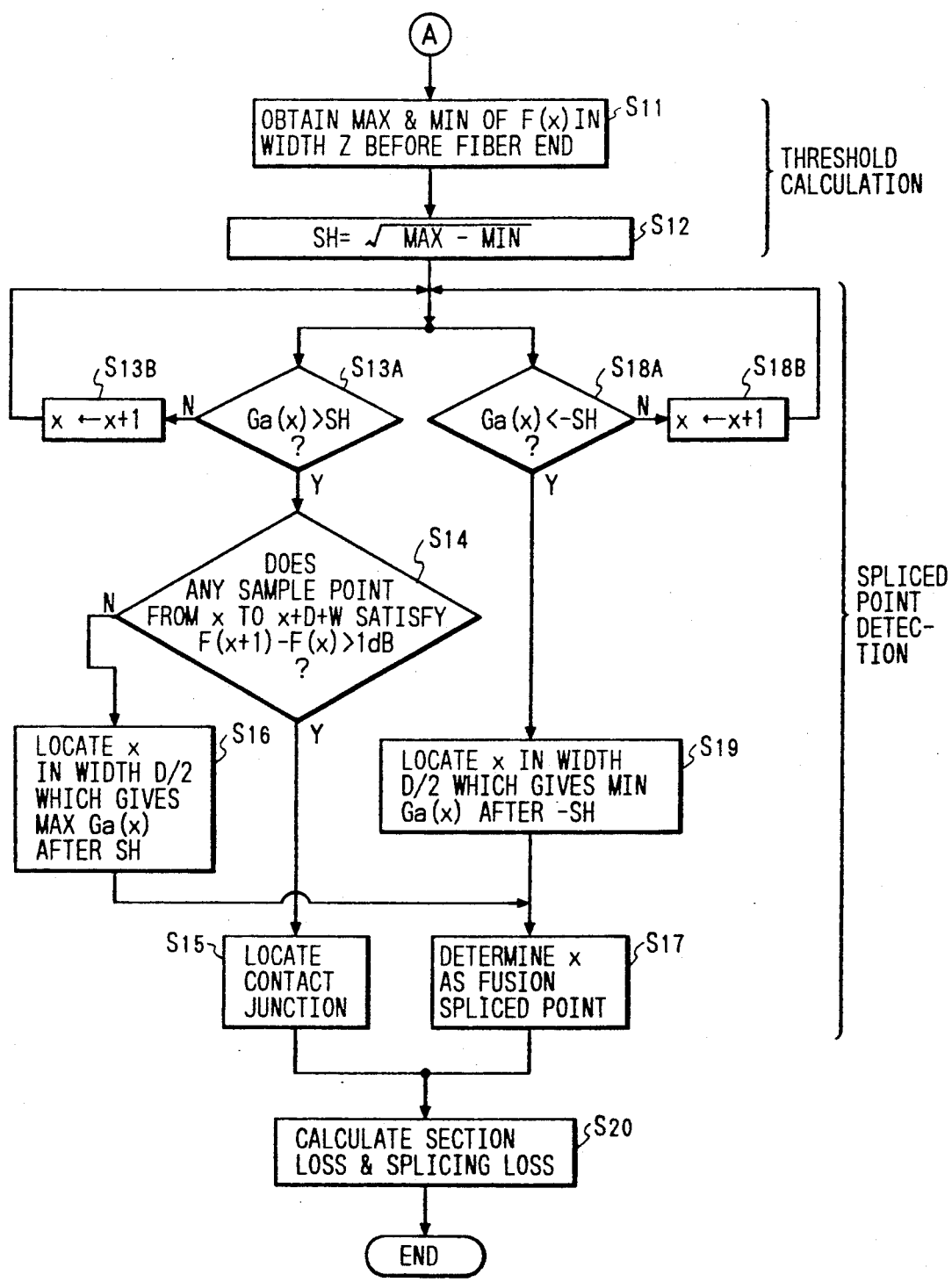

APPARATUS AND METHOD FOR INSPECTING OPTICAL FIBERS

BACKGROUND OF THE INVENTION

The present invention relates to an optical fiber inspection apparatus and method, commonly referred to as OTDR, for detecting a spliced point, defective point or breaking point of an optical fiber, or measuring its transmission loss by applying thereinto an optical pulse and measuring the resulting back scattering light.

FIG. 1 shows in block form a conventional optical fiber inspection apparatus. In response to a pulse Ep from a control signal generator 10 an optical pulse generator 11 emits an optical pulse Op, which is applied via an optical directional coupler 12 to one end of an optical fiber under test 13. Back scattering light resulting from the propagation of the optical pulse Op through the optical fiber 13 is incident via the optical directional coupler 12 to an optoelectro transducer 14, by which it is transduced to an electric signal. The electric signal is provided to an A/D converter 15, wherein it is sampled by a sampling clock $CK_s$ of a fixed period $\Delta t$, generated by the control signal generator 10 in synchronization with the pulse Ep, and each sample thus obtained is converted to a digital signal. The digital signal is converted by a logarithmic converter 16 to logarithmic form. The thus converted digital signal F(x) (x indicating the number, 0, 1, . . ., of each sample point) represents the intensity of the back scattering light from the distal or distant end (i.e. the end point) of the optical fiber 13, and for example, as shown on Row A in FIG. 2, the level of the back scattering light lowers as the number x of the sample point becomes larger. At a spliced or defective point of the optical fiber 13 an abrupt attenuation 17 occurs, and at the end or breaking point of the optical fiber 13, a large Fresnel reflection 18 occurs, after which only noise 19 is received.

To lessen the influence of noises, according to the prior art, digital signals of a plurality of successive samples are averaged in a smoothing section 21; for example, a calculation $\{F(x-1)+F(x)+F(x+1)\}/3$ is performed, that is, the digital signals of three samples are averaged to obtain date F'(x) on the number of the sample point x. This calculation takes place by steps of three samples while shifting them one by one, that is, a moving average is calculated; thus, an averaged sequence F'(x) shown on Row B in FIG. 2 is obtained. Next, in a difference calculating section 22 a difference between values of the averaged sequence F'(x) at every adjacent sample points, $\Delta'F(x)=F'(x+1)-F'(x)$, is calculated to obtain a difference sequence depicted on Row C in FIG. 2. Then the sample point x of that position on the difference sequence $\Delta F'(x)$ where its absolute value is greater than a predetermined value is detected in a spliced point detecting section 23. The position on the potical fiber 13 corresponding to the thus detected sample point x is decided to be a spliced point, defective point or breaking point. Letting the sampling interval, the refractive index of the optical fiber 13 and the light velocity in a vacuum be represented by $\Delta t$, n and C, respectively, the distance L along the optical fiber 13 (i.e. the length L of the optical fiber 13) corresponding to the sample number x is expressed by $L=\Delta t \cdot x \cdot C/2n$.

As described above, the prior art detects a point of change by calculating the difference in value between adjacent sample points, i.e. through differentiation. Accordingly, if the sampling interval $\Delta t$ is shortened to increase the accuracy of measurement of the distance L, the difference in data between adjacent sample points is so small that a large diference value (or differentiated value) $\Delta F'(x)$ cannot be obtained at the change point (i.e. the spliced point), and consequently, the detection of the spliced point becomes difficult accordingly. In addition, since the moving average is calculated for smoothing so as to avoid the influence of noise superimposed on the back scattering light, the change of data in the vicinity of the change point 17 becomes dull as shown on Row B in FIG. 2, and hence the difference value (i.e. the differentiated value) $\Delta F'(x)$ decreases, making it more difficult to detect the spliced point.

Moreover, the prior art uses a large number of samples and involves the difference calculation after the smoothing operation, and hence requires an appreciably large amount of time for processing. If the sampling interval $\Delta t$ is prolonged to make the difference value $\Delta F'(x)$ large, then the accuracy of measurement of the distance L is impaired.

SUMMARY OF THE INVENTION

It is therefore an object of the present invention to provide an optical fiber inspection apparatus and method which have high accuracy and high sensitivity of measurement.

According to the present invention, back scattering light by an optical pulse of a predetermined width, applied to an optical fiber, is received and converted into an electric signal, which is then converted into a digital signal, by sampling with a fixed period. In difference calculating means, digital signals at a given first sample point and those preceding it by a predetermined number are averaged to obtain data at the first sample points, and digital signals at a second sample point following the first one by a number of sample points corresponding to the width of the optical pulse and at sample points following the second one by the abovementioned predetermined number are averaged to obtain data at the second sample point. The difference between the data at the first sample point and the data at the second sample point is calculated. The averaging calculation and the difference calculation are performed for each sample point to obtain difference data at each sample point.

A difference data waveform thus obtained provides a high output level at an optical fiber spliced point, defective point, fiber end, or breaking point, and consequently, their positions can be detected by spliced point detecting means with a high degree of accuracy. For more accurate measurement, the slope of the digital signal sequence is detected as an offset and the thus detected offset is removed from the difference data obtained by the difference calculating means. Then the sample point is detected where the difference data, from which the offset has been removed, has an absolute value greater than a threshold value, and the spliced point, defective point, breaking point or end point of the optical fiber is obtained from the sample point. These operations are carried out by the spliced point detecting means.

DESCRIPTION OF THE PREFERRED EMBODIMENTS

Figure 1:
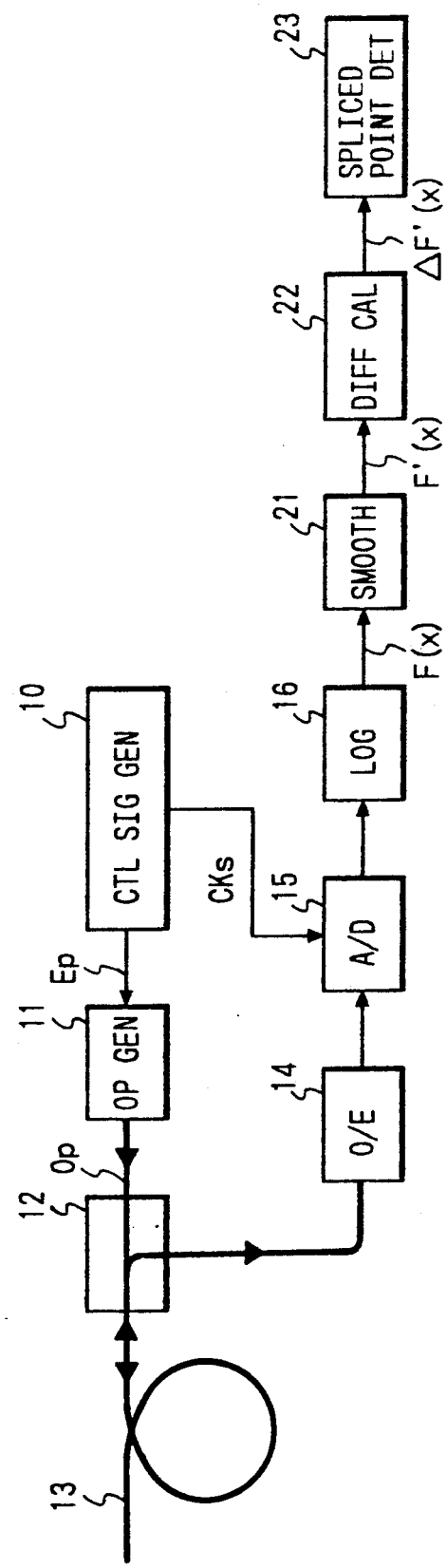
FIG. 1 is a block diagram showing a conventional optical fiber inspection apparatus.
Figure 2:
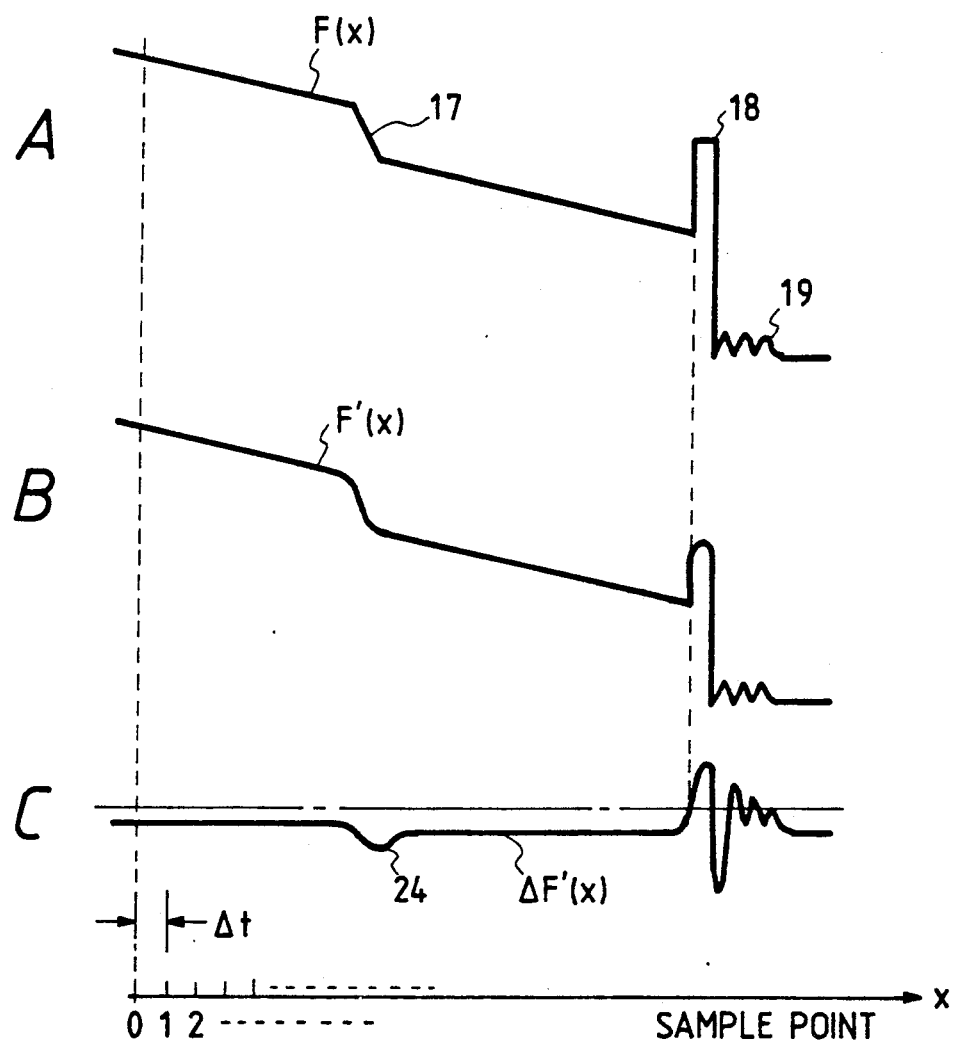
FIG. 2 is a timing chart showing, by way of example, waveform data F(x), smoothed data F'(x) and difference data, for explaining the operation of the inspection apparatus shown in FIG. 1.
Figure 3:
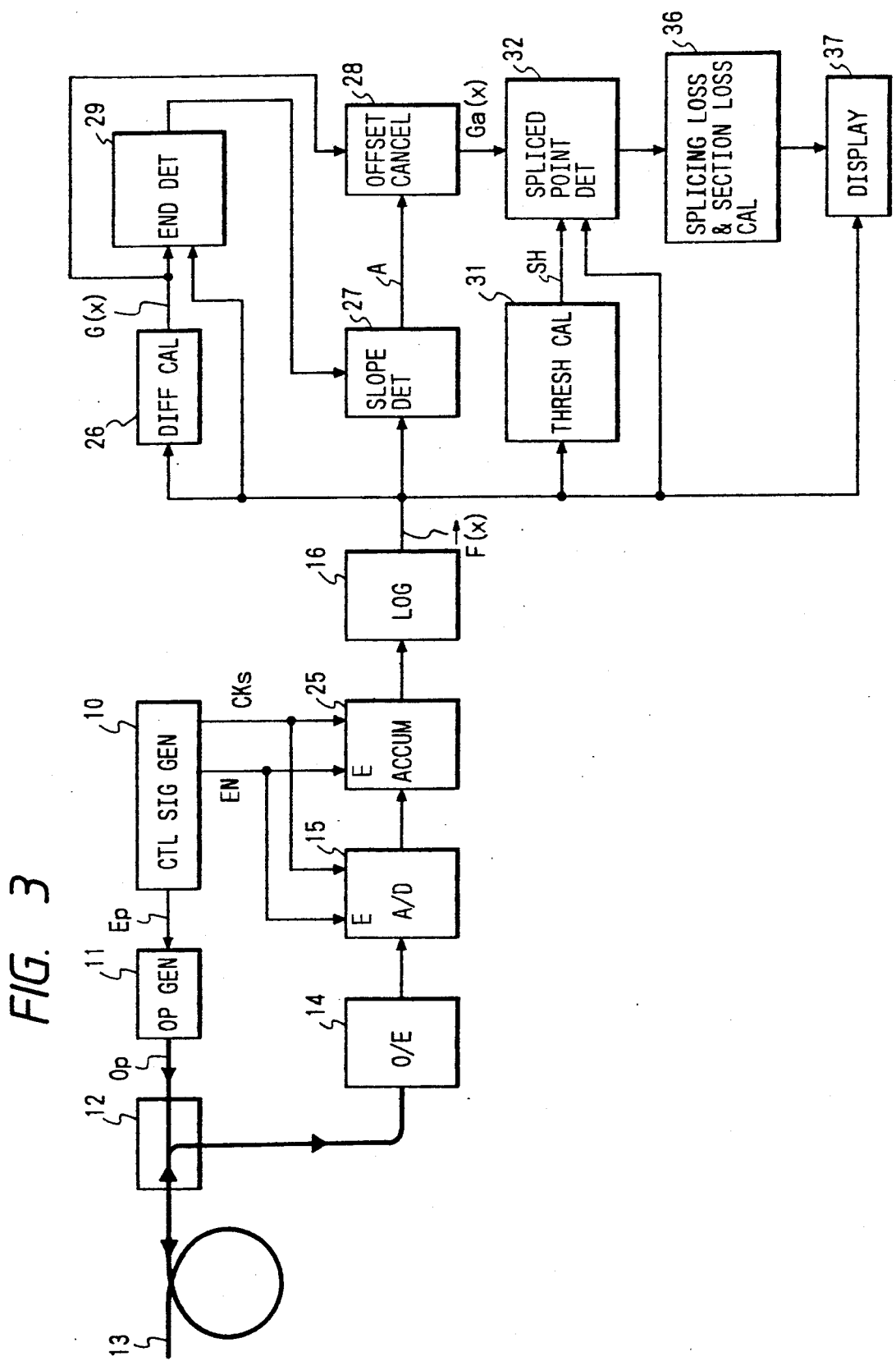
FIG. 3 is a block diagram illustrating an embodiment of the present invention.

FIG. 3 illustrates in block form an embodiment of the present invention, in which the parts corresponding to those in FIG. 1 are identified by the same reference numerals. In this embodiment an accumulator 25 is provided, whereby a sequence of sample data, obtained upon each occurrence of the optical pulse Op of a width D, is accumulated every corresponding sample to obtain sample data of a high SN ratio. The control signal generator 10 includes a reference signal generator for generating a reference signal of 100 MHz, for example, and applies the reference signal as the sampling clock $CK_s$ to the A/D converter 15 and the accumulator 25. Further, the control signal generator 10 frequency-divides the reference signal to obtain the control pulse Ep of a desired period T ranging from 10 μsec to 1 mmsec, which control pulse Ep is applied to the optical pulse generator 11. Thus, the optical pulse generator 11 repeatedly generates the optical pulse Op with the period T in synchronization with the sampling clock $CK_s$. Besides, the control signal generator 10 generates a control signal EN by which the A/D converter 15 is enabled in synchronization with each generation of the control pulse Ep, held in the enabled state during counting of a predetermined number of sampling clock pulses $CK_s$ and then disabled. The control signal generator 10 is designed to generate the control signal EN by a predetermined number N of times.

Back scattering light from the optical fiber 13, generated by each optical pulse Op, is converted by the opto-electro transducer 14 to an electric signal. The electric signal is applied to the A/D converter 15, wherein it is converted into a digital value (i.e. sample data), by the sampling clock $CK_s$ during the period of the control signal EN. A series of sample data obtained upon each occurence of the optical pulse Op is accumulated by the accumulator 25 every corresponding sample point x. Pieces of accumulated data for the respective sample points x, thus obtained in synchronization with the N optical pulses Op, are sequentially output from the accumulator 25 and are converted by the logarithmic converter 16 to logarithmic form, obtaining the digital signal sequence F(x).

Figure 4:
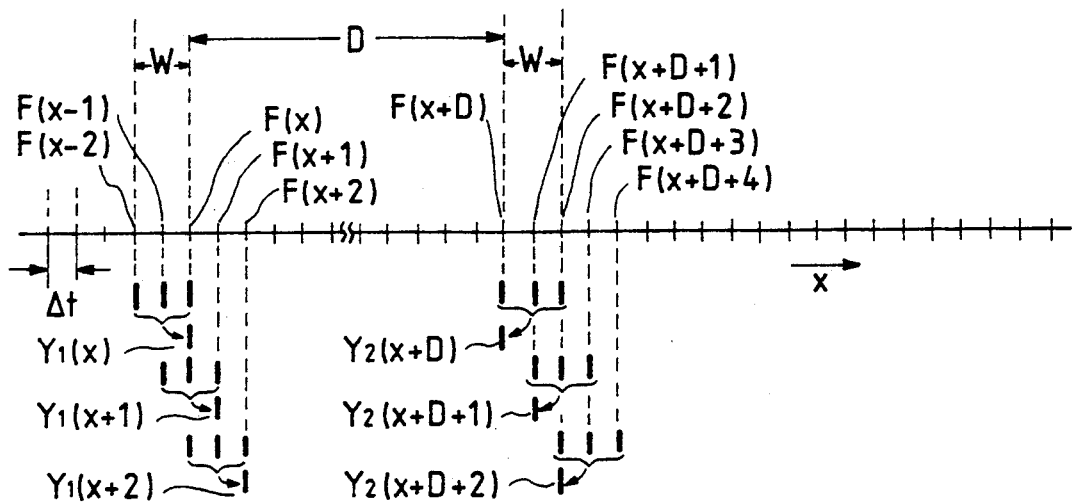
FIG. 4 is a graph showing an example of the relationship between smoothing calculations and the resulting differences in the present invention.

According to the present invention, the digital signal sequence F(x) thus obtained is subjected to averaging processing in a difference calculating section 26. That is, the digital signals at each sample point x and those preceding it by a predetermined number W are averaged to obtain data $Y_1(x)$ at the sample point x, and the digital signals at a sample point x+D following the above-said one x by a number D corresponding to the width of the optical pulse Op and at sample points following that x+D by the predetermined number W are averaged to obtain data $Y_2(x+D)$ at the sample point x+D. Then, the difference between these pieces of averaged data, $G(x)=Y_2(x+D)-Y_1(x)$, is calculated for each sample point x. The number W of sample points for averaging is chosen such that noise can sufficiently be suppressed, and in this instance, the number W is selected sufficiently smaller than the width D of the optical pulse Op. A description will be given, with reference to FIG. 4, of the difference calculation so as to facilitate a better understanding of it. Now, let it be assumed that the number W of sample points for averaging is 3. In this instance, a value $Y_1(x)$ obtained by averaging digital signals $F(x-2)$, $F(x-1)$ and $F(x)$ is used as data at the sample point x, and a value $Y_2(x+D)$ obtained by averaging digital signals $F(x+D)$, $F(x+D+1)$ and $F(x+D+2)$ is used as data at the sample point x+D. The difference $Y_2(x+D)-Y_1(x)$ between these averaged values is regarded as the difference value G(x) between the digital singals at the sample points x and x+D. Next, an average value $Y_1(x+1)$ of digital signals $F(x-1)$, $F(x)$ and $F(x+1)$ and an average value $Y_2(x+1)$ of digital signals $F(x+D+1)$, $F(x+D+2)$ and $F(x+D+3)$ are calculated and then their difference value $G(x+1)=Y_2(x+D+1)-Y_1(x+1)$ is obtained. Thereafter, the difference value G(x) is similalry calculated for each sample point x.

Figure 5:
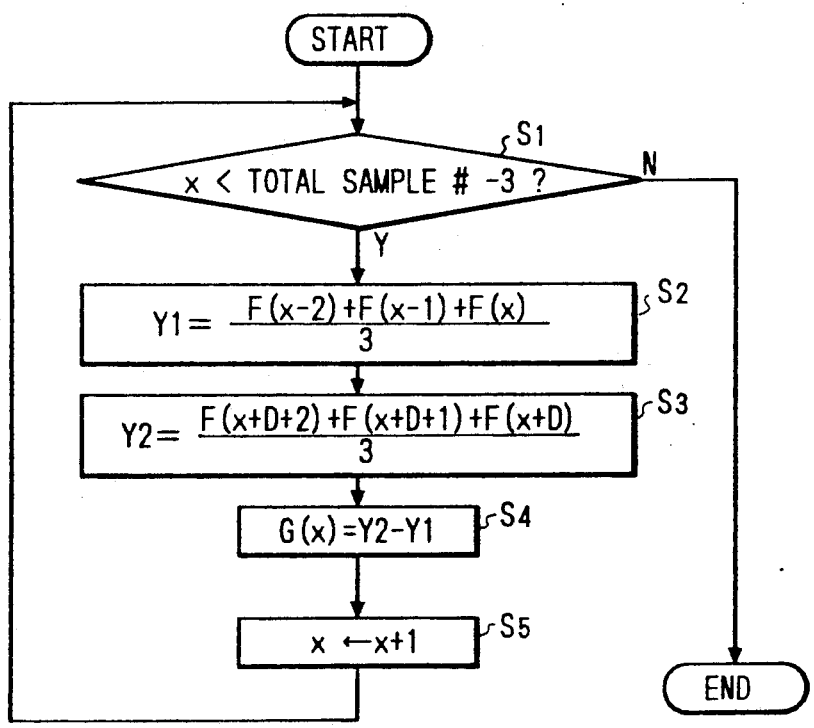
FIG. 5 is a flowchart showing an example of processing by a difference calculating section 26.

FIG. 5 is a flowchart showing the procedure for calculating the difference value G(x). Also in this case, the number of samples to be smoothed is assumed to be 3. The process starts with step $S_1$ in which it is checked whether x is smaller than the total number of data (a maximum value of sample point x) subtracted by 3, and if so, the following calculations are performed in steps $S_2$ and $S_3$, respectively;

$$Y_1 = \{F(x-2) + F(x-1) + F(x)\}/3$$

and $$Y_2 = \{F(x+D+2) + F(x+D+1) + F(x+D)\}/3$$

In step $S_4$ their difference value, $G(x)=Y_2-Y_1$, is calculated, and in step $S_5$, x is incremented by 1, after which the process returns to step $S_1$. If x becomes smaller than the total number of data, $-3$, in step $S_1$, then the process in the difference calculating section 26 is finished.

In the case where the logarithmic waveform data (a logarithmic digital signal sequence) F(x) of back scattering light, available from the logarithmic converter 16, is such as shown on Row A in FIG. 6, the difference waveform G(x) obtained by the difference calculating section 26 as mentioned above is such as depicted on Row B in FIG. 6.

Figure 6:
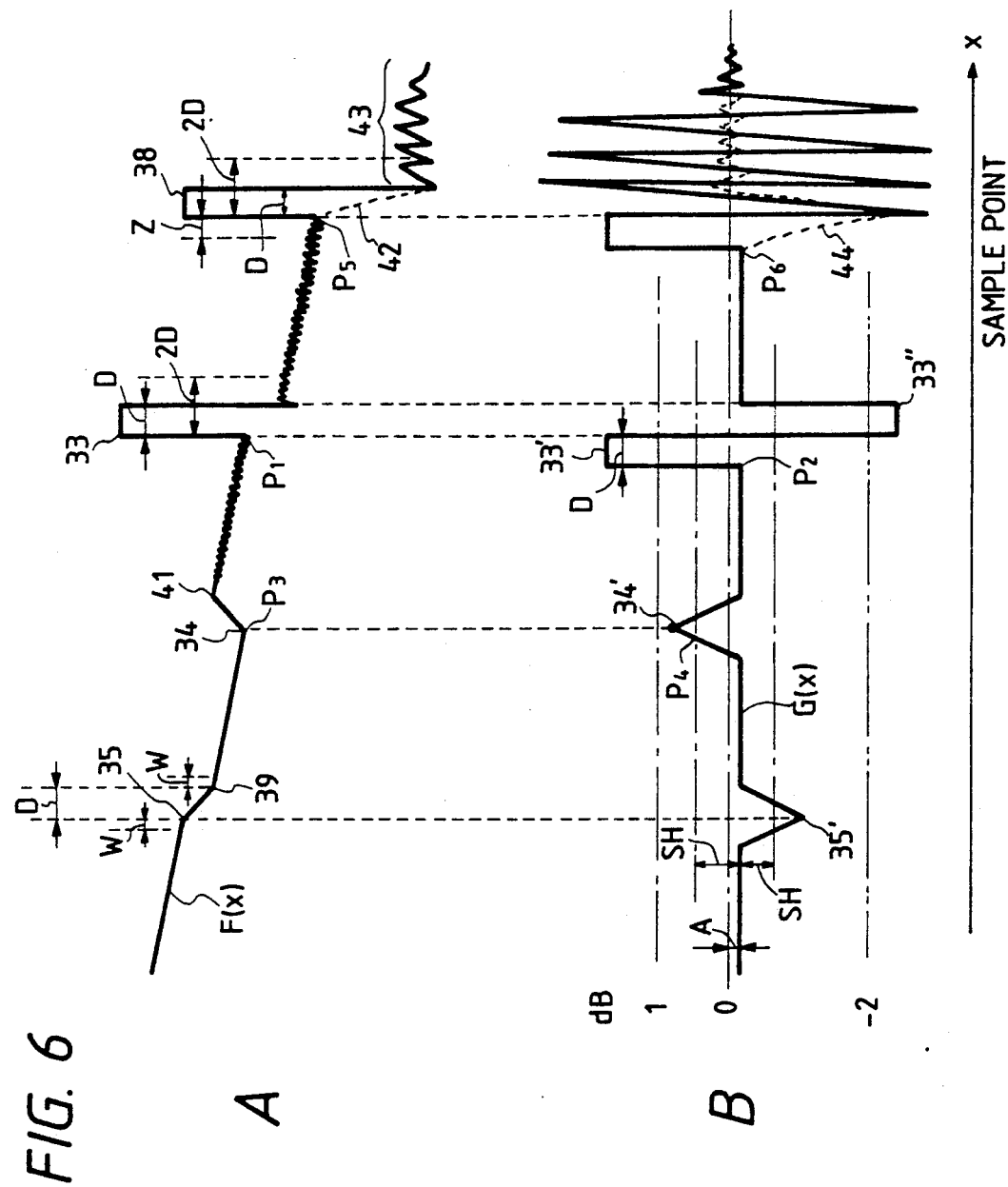
FIG. 6 is a timing chart showing examples of waveform data F(x) of back scattering light and the corresponding difference waveform G(x)

The attenuation of the back scattering light between points 35 and 39 on the curve representing the waveform data F(x) shown on Row A in FIG. 6 is caused by an optical fiber spliced point or defective point at the corresponding position in the lengthwise direction of the optical fiber 13, and the width of the section between the points 35 and 39 corresponds to the width D of the optical pulse Op, because W<<D. Similarly, an increase in back scattering in the section between points 34 and 41 is also attributable to a fiber spliced portion at the corresponding position in the lengthwise direction of the optical fiber 13. A high-intensity back scattering pulse 33 is caused by Fresnel reflection by an optical connector provided at the corresponding position in the optical fiber 13, and a high-intensity back scattering pulse 38 from the farthermost point is also attributable to Fresnel reflection at the end point or broken point of the optical fiber 13. The widths of these pulsee 33 and 38 also substantially correspond to the width D (precisely speaking, D+W) of the optical pulse Op. The attenuation in each linear section of the curve F(x), that is, in each of sections to the point 35 in the direction of the sample point x, from the point 39 to 34, from the point 41 to P1, results from a transmission loss by the optical fiber 13. Accordingly, a value obtained by dividing the attenuation by the corresponding section, that is , the slope represents the transmission loss per unit length of the optical fiber 13 in that section.

The difference waveform G(x) is provided as data offset from zero by the slope fo the entire waveform data F(x), that is, by the transmission loss A by the optical fiber 13. Since the offset A changes with the kind of the optical fiber 13 and the measuring wavelength, the slope A of the waveform data F(x) is detected by a slope detecting section 27 and the slope A is cancelled, as the offset, by an offset cancelling section 28 from the difference waveform G(x) so as to locate the optical fiber spliced point without being affected by the kind of the optical fiber 13 and the measurement wavelength.

Figure 7A:
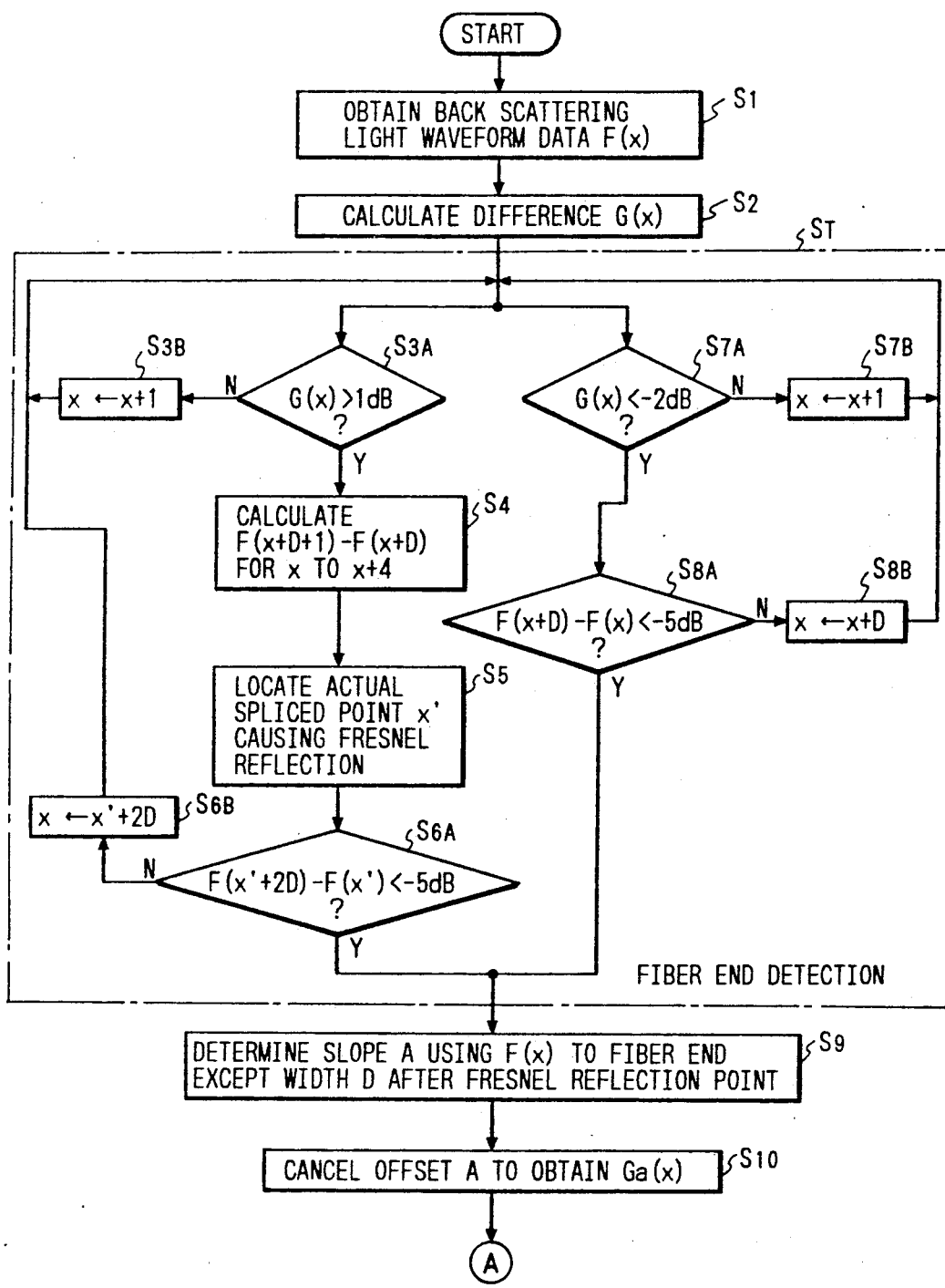
FIGS. 7a & b are a flowchart showing an example of processing of the waveform data F(x) in the present invention.

Various known methods can be used to detect the slope A. The slope A is obtained by a method of least squares, using the waveform data F(x) of back scattering light shown on Row A in FIG. 6, for instance. To perform this, it is necessary to detect or locate an end point (i.e. a broken point) of the optical fiber 13. This is done in an end point detecting section 29 through utilization of the difference waveform G(x). FIG. 7 shows all data processing steps in the optical fiber inspection apparatus according to the present invention, and a description will be given of an example of such end point detection processing involved therein. At first, the waveform data F(x) of back scattering light is obtained as referred to previously (step $S_1$), after which the difference waveform G(x) is obtained by the difference calculation described previously with respect to FIG. 5 (setp $S_2$), and then fiber end detection processing $S_T$ is performed using the difference waveform G(x). The fiber end detection processing $S_T$ includes processing for locating a point of Fresnel reflection (pulse 38 in FIG. 6) which is caused by an open end of the optical fiber 13, for example, and processing for the state in which substantially no reflection is caused at the fiber end (the abrupt attenuation indicated by broken line 42). These processes are performed at the same time, or one of them is carried out first.

In the case of locating the fiber end position by detecting a Fresnel reflection, since the level of Fresnel reflection is very high, it is checked whether G(x) is greater than a predetermined value, for example, 1 dB (step $S_{3\,A}$), and if it is smaller than 1 dB, then it is decided not to be a Fresnel reflection point. In this instance, the process proceeds to step $S_{3\,B}$, in which x is incremented by one, and the process goes bavk to step $S_{3\,A}$, in which G(x) is greater than 1 dB, the process proceeds to step $S_4$, in which the difference between the digital signals at adjacent sample points, F(x+D+1)−F(x+D), is calculated for each of the sample points x t (x+k), k being an integer slightly larger than W, for example, k=4. Next, in step $S_5$ a sample point x'=x+D where G(x) is greater than 1 dB is detected as a fiber spliced point ($P_1$ or $P_5$) which causes the Fresnel reflection, and in step $S_6\,A$ it is checked whether the difference between F(x') at the sample point and a digital signal F(x'+2D) at a sample point about twice the width D of the optical pulse Op thereafter is greater than a predetermined value, for instance −5 dB. If the difference, F(x'+2D)−F(x'), is smaller than −5 dB, it is decided that the data F(x'+2D) at the sample point x'+2D is noise in a portion 43 on the waveform F(x) shown in FIG. 6 and that the point x' having caused the Fresnel reflection is a fiber end $P_5$. When the above-said difference is larger than −5 dB, it is decided that the large value of the digital signal F(x') indicates Fresnel reflection (the reflection pulse 33 in FIG. 6) by a contact junction $P_1$, and in step $S_6\,B$, x'+2D is substituted for x and then G(x) is checked again in step $S_{3\,A}$.

At the fiber end where substantially no reflection occurs, the level of the waveform F(x) at sample points after the fiber end $P_5$ abruptly drops as indicated by the broken line 42 in FIG. 6 and the level of the corresponding waveform G(x) also starts to abruptly drop at a point $P_6$ preceding the point $P_5$ by substantially D, as indicated by the broken line 44. In the detection of such a fiber end which causes no reflection, it is checked in step $S_{7\,A}$ whether G(x) is smaller than a predetermined value, for example, −2 dB, and if not, then x is incremented by one in step $S_{7\,B}$ and G(x) at the next sample point is checked again in step $S_{7\,a}$. Where G(x) is small than −2 dB, the process proceeds to step $S_{8\,A}$, in which it is checked whether the difference, F(x+D)−F(x), between the digital signal F(x) at the sample point x and the digital signal F(x+D) at the sample point X+D after it by the width D of the optical pulse Op is smaller than a predetermined value, for example, −5 dB. If the difference is larger than −5 dB, then it is decided that F(x+D) is a negative pulse 33 on the waveform G(x) shown on Row B in FIG. 6, and in step $S_{8\,B}$, x+D is substituted for x, after which the process goes back to step $S_{7\,A}$. When it is determined in step $S_{8\,A}$ that the above-mentioned difference is smaller than −5 dB, it is decided that F(x+D) is noise having passed through the fiber end $P_5$ and that the sample point x is the non-reflecting end $P_5$ of the optical fiber 13.

After such detection of the fiber end, the slope, that is, the transmission loss A per unit length of the optical fiber 13 is calculated in the slope calculating section 27, using the data F(x) about the back scattering light from the starting point to the end point of the optical fiber 13 (step $S_9$). In this instance, the Fresnel reflection pulse 33 assumes a large value, and hence is not suitable for accurately detecting the slope and the data F(x) over the width D of the optical pulse from the sample point P, of the Fresnel reflection point is not used for the calculation of the slope. The slop A thus obtained is cancelled, as an offset, in the offset cancelling section 28 from the difference waveform G(x) to obtain Ga(x) (step $S_{10}$).

To compare the thus obtained difference waveform Ga(x) with a threshold value SH for locating or detecting a spliced point, the threshold value SH is calculated in a threshold calculating section 31 from the waveform data F(x) of the back scattering light. Since in the vicinity of the fiber end $P_1$ noise becomes relatively large with the back scattering light than at the input end of the optical fiber, the threshold value SH is determined, based on the noise contained in the data of the back scattering light near the fiber end $P_1$. In this example, maximum and minimum values max and min of the waveform data $F(x)$ in a section Z over tens of sample points immediately before the end point $P_5$ are calculated (step $S_{11}$) and the threshold value SH is computed by $\sqrt{max - min}$ (step $S_{12}$).

Next, the difference waveform $Ga(x)$ now free from the offset and the threshold value SH are used to detect a spliced point in a spliced point detecting section 32. In this case, it is checked in step $S_{13\,A}$ in FIG. 7 whether the difference waveform $Ga(x)$ is greater than the threshold value SH, and if not, the sample point X is stepped by one in step $S_{13\,B}$ and then the difference waveform $Ga(x)$ is checked again in step $S_{13\,A}$. When the difference waveform $Ga(x)$ is greater than the threshold value SH, the process proceeds to step $S_{14}$, in which the difference, $F(x+1)-F(x)$, between pieces of waveform data is calculated for each of the sample points x to $(x+D+W)$ and it is checked whether the difference value is larger than 1 dB. When the difference value $F(x+1)-F(x)$ is larger than 1 dB, the smaple point x at that time is detected as the contact junction $P_1$, (step $S_{15}$). When the difference value $F(x+1) - F(x)$ is not larger than 1 dB, the process proceeds to step $S_{16}$, in which the sample point x of a peak 34′ is obtained at which the difference waveform $Ga(x)$ becomes maximum in the section from the sample point where the difference waveform $Ga(x)$ became greater than the threshold value SH to a sample point $x+D/2$ a period corresponding to the half of the optical pulse width D after the sample point x, and the sample point x of the peak 34′ is detected as a fusion-spliced point 34 where the transmission loss decreases, that is, the waveform $Ga(x)$ has an upward peak (step $S_{17}$). That is to say, as will be seen from FIG. 6, the difference output of the Fresnel reflection 33 by the contact junction and the difference output 34′ by the fusion-spliced point 34 where the transmission loss decreases, both exceed the threshold value SH and are each detected as a spliced point in step $S_{13\,A}$, but the Fresnel reflection 33 is a reflection which abruptly becomes large and its difference output $Ga(x)$ is equal to or greater than 1 dB at the lowest. On the other hand, a splicing loss at the fusion-spliced point $P_3$ (substantially corresponding to the peak 34′) is usually very small and cannot be equal to or greater than 1 dB at the maximum.

Next, for detecting the fusion-spliced point 35 where the attenuation increases, that is, the waveform $Ga(x)$ has a downward peak, it is checked in step $S_{18\,A}$ in FIG. 7 whether the difference value $Ga(x)$ is smaller than a threshold value $-SH$. When the difference value $Ga(x)$ is greater than the threshold value $-SH$, the sample point x is stepped by one in step $S_{18\,B}$ and it is checked again in step $S_{18\,A}$ whether the difference value $Ga(x)$ is smaller than the threshold value $-SH$. When the difference value $Ga(x)$ is smaller the threshold value $-SH$, the process proceeds to step $S_{19}$, in which the sample point x of a trough 25′ is obtained at which the difference value $Ga(x)$ becomes minimum in the section from the sample point x where the difference waveform $Ga(x)$ became smaller than the threshold $-SH$ to a sample point $x+D/2$ a period corresponding to the half of the optical pulse width D after the sample point x, and the sample point x is detected as the downward fusion-spliced point 35 (step $S_{17}$).

Following the above, a splicing loss, a section loss, etc. are calculated in a splicing loss and section loss calculating section, as required (step $S_{20}$), and they are displayed on a display 37.

To distinguish between the reflection 34 by the fusion-spliced point and the Fresnel reflection in step $S_{14}$, it may also be determined, as will be seen from FIG. 6, that the difference waveform $Ga(x)$ is the Fresnel reflection when it assumes a negative peak value following a positive peak value.

As described above, according to the present invention, the average value of digital signal at a plurality of sample points immediately preceding one sample point is used as data at the said one sample point, and the average value of digital signals at a predetermined number of sample points immediately after a sample point which follows the said one sample point after the potical pulse width D, is used as data at that sample point; then, the difference between such pieces of data is calculated. On the other hand, the interval between the reflection point 35 corresponding to a fusion-spliced point and the immediately following bent point 39 of the waveform data $F(x)$ in FIG. 6 corresponds to the optical pulse width; so that if the point 35 is taken as x, the difference between the average value of the digital signals in the immediately preceding range W and the average value of the digital signals in the range W immediately after the point 39 $(D+x)$ is calculated, and consequently, the difference waveform $Ga(x)$ appears obviously, without making its changing points dull as shown on Row B in FIG. 6. The interval between the reflection point 34 corresponding to the fusion-spliced point and the immediately following bent point also corresponds to the optical pulse width D, and the width of the Fresnel reflection 33 also corresponds to the optical pulse width D. While in the present invention the data $F(x)$ is averaged (smoothed) using the width W, the changing points of the waveform data $F(x)$ clearly appear on the difference waveform $G(x)$, ensuring accurate detection of the spliced point. In addition, since the interval $\Delta t$ between the sample points s can be selected small as desired, the position of the spliced point can be measured with high accuracy.

Moreover, since the slope A is cancelled as an offset from the difference waveform $G(x)$, the spliced point can be located with certainty and precision. In addition, since the smoothing processing and the difference processing are performed simultaneously, the overall processing time is short.

It will be apparent that many modifications and variations may be effected without departing from the scope of the novel concepts of the present invention.

What is claimed is:

1. An optical fiber inspection method comprising:
   a step of applying an optical pulse of a fixed width, from an optical pulse generator, to an optical fiber at one end thereof;
   a step of receiving back scattering light from said optical fiber and converting it to an electric signal;
   a step of sampling said electric signal with a fixed period and converting each sample to a digital signal;
   a difference calculating step wherein an average value of said digital signals at a given first sample point and at a predetermined number of immediately preceding sample points is used as data at said first sample point, an average value of said digital signals at a second sample point after said first sample point by a number of sample points corresponding to the width of said optical pulse and at said predetermined number of sample points immediately following said second sample point is used as data at said second sample point, and the difference between said average values at said first sample point and said data at said second sample point is calculated;

a difference waveform data generating step wherein the calculations for obtaining said average values and said difference in said difference calculating step are repeated while shifting the sample points one by one to obtain a series of difference waveform data at said same points; and an analysis step wherein said difference waveform data are analyzed to obtain results of inspection on said optical fiber.

2. The method of claim 1, wherein said analysis step includes a step of detecting abrupt changing points of said difference waveform data and a spliced point detecting step of detecting a spliced point of said optical fiber, based on said abrupt changing points.

3. The method of claim 2, wherein said spliced point detecting step includes: a slope detecting step for detecting the slope of said digital signal; an offset cancelling step for cancelling said detected slope, as an offset, from said difference waveform data obtained in said difference calculating step; and a spliced point detecting step for locating a spliced point of said optical fiber by detecting a sample point of that one of pieces of said difference waveform data having cancelled therefrom said offset which has an absolute value greater than a threshold value.

4. The method of claim 3, wherein said slope detecting step includes a step of detecting an end point of said optical fiber and a step of determining a digital signal to be used in said slope detecting step, based on said detected end point of said optical fiber, said end point detecting step including: a step for checking whether said difference waveform data is greater than a first predetermined value; a step wherein, if said difference waveform data is greater than said first predetermined value, the difference is calculated between said digital signals at adjacent ones of a first predetermined number of sample points after that of said difference data being greater than said first predetermined value; a step of detecting a sample point where said difference is greater than a second predetermined value and of deciding that said sample point is a fiber end which causes a Fresnel reflection; a step of checking whether said difference waveform data is smaller than a third predetermined value smaller that said first predetermined one; a step wherein, if said difference waveform data is smaller than said third predetermined value, the difference is calculated between digital signals at that sample point and at a sample point a second predetermined number thereafter; and a step wherein, if the value of said difference is smaller than a fourth predetermined value, the sample point at that time is decided to be a non-reflecting fiber end.

5. The method of claim 3, wherein said spliced point detecting step includes a threshold value calculating step wherein an intermediate value between maximum and minimum ones of said digital signals at a predetermined number of sample point preceding the end point of said optical fiber is calculated as said threshold value.

6. The method of claim 3, wherein said spliced point detecting step includes: a step of detecting that said difference waveform data having cancelled therefrom said offset is greater than said threshold SH; a step wherein the difference is calculated between said digital signals at each of a fixed number of sample points after said sample point of said difference waveform data greater than said threshold value being detected and at the next sample point; a step of deciding whether the value of said difference is greater than a first predetermined value; a step wherein the sample point at which said value is greater than said first predetermined value is decided to be a contact junction of said optical fiber and, if said value is smaller than said first predetermined value, the sample point at which said difference waveform data having cancelled therefrom said offset becomes greater than at the sample point at which said difference waveform data is detected as greater than said threshold value SH and at a second predetermined number of immediately following sample points is decided to be a fusion-spliced point; and a step wherein it is detected that said difference waveform data having cancelled therefrom said offset is smaller than a threshold value $-SH$ and the sample point at which said difference waveform data having cancelled therefrom said offset becomes smaller than at the sample point at which said difference waveform data is detected as smaller than said threshold value $-SH$ and at said second predetermined number of immediately following sample point is decided to be a fusion-spliced point.

7. The method of claim 2, further including an accumulating step wherein the output digital signals from an A/D converter responding to a predetermined number of optical pulses are accumulated for each of sample points corresponding thereto and a logarithmic converting step wherein said accumulated digital signal is converted to a logarithm value for each sample point, said digital signals converted to logarithmic form being used as said digital signals in said difference calculating step.

8. The method of claim 3, further including an accumulating step wherein the output digital signals from an A/D converter responding to a predetermined number of optical pulses are accumulated for each of sample points corresponding thereto and a logarithmic converting step wherein said accumulated digital signal is converted to a logarithm value for each sample point, said digital signals converted to logarithmic form being used as said digital signals in said difference calculating step.

9. The method of claim 4, further including an accumulating step wherein the output digital signals from an A/D converter responding to a predetermined number of optical pulses are accumulated for each of sample points corresponding thereto and a logarithmic converting step wherein said accumulated digital signal is converted to a logarithm value for each sample point, said digital signals converted to logarithmic form being used as said digital signals in said difference calculating step.

10. The method of claim 5, further including an accumulating step wherein the output digital signals from an A/D converter responding to a predetermined number of optical pulses are accumulated for each of sample points corresponding thereto and a logarithmic converting step wherein said accumulated digital signal is converted to a logarithm value for each sample point, said digital signals converted to logarithmic form being used as said digital signals in said difference calculating step.

11. The method of claim 6, further including an accumulating step wherein the output digital signals from an A/D converter responding to a predetermined number of optical pulses are accumulated for each of sample points corresponding thereto and a logarithmic converting step wherein said accumulated digital signal is converted to a logarithm value for each sample point, said digital signals converted to logarithmic form being used as said digital signals in said difference calculating step.

12. An optical fiber inspecting apparatus comprising:
optical pulse generating means for generating an optical pulse of a fixed width for incidence to one end of an optical fiber;
optoelectro transducer means for receiving back scattering light from said optical fiber and converting said light to an electric signal;
A/D converter for sampling said electric signal from said optoelectro transducer means with a fixed period to convert each sample to a digital signal; and
signal processing means for processing said digital signal to produce a signal representing the characteristic of said optical fiber;
wherein said signal processing means includes difference calculating means whereby an average value of said digital signals at a given first sample point and at a predetermined number of preceding sample points is used as data at said first sample point, an average value of said digital signals at a second sample point after said first sample point by a number of sample points corresponding to the width of said optical pulse and at said predetermined number of sample points immediately following said second sample point is used as data at said second sample point, the difference between said average value at said first sample point and said data at said second sample point is calculated, and said calculations for obtaining said average values and said difference are repeated while shifting the sample points one by one to obtain a series of difference waveform data at said sample points.

13. The apparatus of claim 12, further including spliced point detecting mean supplied with said difference waveform data, for detecting its changing points and detecting a spliced point of said optical fiber, based on said changing points.

14. The apparatus of claim 13, wherein said spliced point detecting means includes: slope detecting means for detecting a slope of said digital signal; offset cancelling means for cancelling said detected slope, as an offset, from said difference waveform data obtained by said difference calculating means; and spliced point detecting means for locating a spliced point of said optical fiber by detecting a sample point of that one of pieces of said difference waveform data having cancelled therefrom said offset which has an absolute value greater than a threshold value.

15. The apparatus of claim 14, wherein said slope detecting means has means for detecting an end point of said optical fiber, a digital signal to be used by said slope detecting means being determined, based on said detected end point of said optical fiber, and said end point detecting means includes means for checking whether said difference waveform data is greater than a first predetermined value; means whereby, if said difference waveform data is greater than said first predetermined value, the difference is calculated between said digital signals at adjacent one of a first predetermined number of sample points after that of said difference data being greater than said first predetermined value; means for detecting a sample point where said difference is greater than a second predetermined value and for deciding that said sample point is a fiber end which causes a Fresnel reflection; means for checking whether said difference waveform data is smaller than a third predetermined value smaller than said first predetermined one; means whereby, if said difference waveform data is smaller than said third predetermined value, the difference is calculated between digital signals at that sample point and at a sample point a second predetermined number thereafter; and means whereby, if the value of said difference is smaller than a fourth predetermined value, the sample point at that time is decided to be a non-reflecting fiber end.

16. The apparatus of claim 14, wherein said spliced point detecting means includes threshold value calculating means whereby an intermediate value between maximum and minimum ones of said digital signals at a predetermined number of sample points preceding the end point of said optical fiber is calculated as said threshold value.

17. The apparatus of claim 14, wherein said spliced point detecting means includes: means whereby it is detected that said difference waveform data having cancelled therefrom said offset is greater than said threshold value SH, the difference is calculated between said digital signals at each of a fixed number of sample points after said sample point of said difference waveform data greater than said threshold value being detected and at the next sample point, the sample point at which said value is greater than said first predetermined value is decided to be a contact junction of said optical fiber, and if said value is smaller than said first predetermined value, the sample point at which said difference waveform data having cancelled therefrom said offset becomes greater than at the sample point at which said difference waveform data is detected as greater than said threshold value SH and at a second predetermined number of immediately following sample points is decided to be fusion-spliced point; and means whereby it is detected that said difference waveform data having cancelled therefrom said offset is smaller than said threshold value —SH, and the sample point at which said difference waveform data having cancelled therefrom said offset becomes smaller than at the sample point at which said difference waveform data is detected as smaller than said threshold value —SH and at said second predetermined number of immediately following sample points is decided to a fusion-spliced point.

18. The apparatus of claim 13, further including an accumulator whereby the output digital signals from an A/D converter responding to a predetermined number of optical pulses are accumulated for each of sample points corresponding thereto and a logarithmic converter whereby said accumulated digital signal is converted to a logarithmic value for each sample point, said digital signals converted to logarithmic form being applied as said digital signals to said difference calculating means.

19. The apparatus of claim 14, further including an accumulator whereby the output digital signals from an A/D converter responding to a predetermined number of optical pulses are accumulated for each of sample points corresponding thereto and a logarithmic converter whereby said accumulated digital signal is converted to a logarithmic value for each sample point, said digital signals converted to logarithmic form being applied as said digital signals to said difference calculating means.

20. The apparatus of claim 15, further including an accumulator whereby the output digital signals from an A/D converter responding to a predetermined number of optical pulses are accumulated for each of sample points corresponding thereto and a logarithmic converter whereby said accumulated digital signal is converted to a logarithmic value for each sample point, said digital signals converted to logarithmic form being applied as said digital signals to said difference calculating means.

21. The apparatus of claim 16, further including an accumulator whereby the output digital signals from an A/D converter responding to a predetermined number of optical pulses are accumulated for each of sample points corresponding thereto and a logarithmic converter whereby said accumulated digital signal is converted to a logarithmic value for each sample point, said digital signals converted to logarithmic form being applied as said digital signals to said difference calculating means.

22. The apparatus of claim 17, further including an accumulator whereby the output digital signals from an A/D converter responding to a predetermined number of optical pulses are accumulated for each of sample points corresponding thereto and a logarithmic converter whereby said accumulated digital signal is converted to a logarithmic value for each sample point, said digital signals converted to logarithmic form being applied as said digital signals to said difference calculating means.

* * * * *

UNITED STATES PATENT AND TRADEMARK OFFICE
CERTIFICATE OF CORRECTION

PATENT NO. : 5,131,743
DATED : July 21, 1992
INVENTOR(S) : Shigeki Kaneko, et al.

It is certified that error appears in the above-identified patent and that said Letters Patent is hereby corrected as shown below:

Title Page, under [56] References Cited, "4,848,463"

should be --4,898,463--;

*Col. 4, line 23, "singals" should be --signals--;

*line 30, "similalry" should be --similarly--;

*Col. 5, line 9, "pulsee" should be --pulses--;

line 21, "fo" should be --of--;

*line 48, "setp: should be --step--;

line 65, "bavk" should be --back--;

line 66, after "G(x) " insert --at the next sample point is checked. When G(x)--;

Col. 6, line 2, after "x" "t" should be --to--;

line 11, after "instance" insert --,--;

line 33, "small" should be --smaller--;

Col. 7, line 24, "smaple" should be --sample--;

UNITED STATES PATENT AND TRADEMARK OFFICE
CERTIFICATE OF CORRECTION

PATENT NO. : 5,131, 743
DATED : July 21, 1992
INVENTOR(S) : Shigeki Kaneko, et al.

It is certified that error appears in the above-indentified patent and that said Letters Patent is hereby corrected as shown below:

*Col. 9, line 52, "that" should be --than--; and

*Col. 11, line 44, "mean" should be --means--.

Signed and Sealed this

Seventh Day of September, 1993

Attest:

BRUCE LEHMAN

Attesting Officer    Commissioner of Patents and Trademarks